(12) United States Patent
Martinez et al.

(10) Patent No.: US 10,518,437 B2
(45) Date of Patent: Dec. 31, 2019

(54) WOOD DOOR SLAB PROCESSING SYSTEM, AND RELATED METHODS

(71) Applicant: Masonite Corporation, Tampa, FL (US)

(72) Inventors: Eric L. Martinez, Tampa, FL (US); Mirko Piasentin, Spresiano (IT); Jason Varelli, Charlotte, NC (US)

(73) Assignee: Masonite Corporation, Tampa, FL (US)

( * ) Notice: Subject to any disclaimer, the term of this patent is extended or adjusted under 35 U.S.C. 154(b) by 382 days.

(21) Appl. No.: 15/468,286

(22) Filed: Mar. 24, 2017

(65) Prior Publication Data

US 2017/0274553 A1 Sep. 28, 2017

Related U.S. Application Data

(60) Provisional application No. 62/425,801, filed on Nov. 23, 2016, provisional application No. 62/312,896, filed on Mar. 24, 2016.

(51) Int. Cl.
*B27M 3/18* (2006.01)
*B23Q 7/02* (2006.01)
(Continued)

(52) U.S. Cl.
CPC ............... *B27M 3/18* (2013.01); *B23Q 7/02* (2013.01); *B23Q 7/14* (2013.01); *B23Q 7/165* (2013.01);
(Continued)

(58) Field of Classification Search
CPC .......... B27M 3/18; B27M 1/08; B23Q 41/02; B23Q 39/046; B23Q 39/042; B23Q 7/02;
(Continued)

(56) References Cited

U.S. PATENT DOCUMENTS 4,062,437 A 12/1977 Knapp
4,503,596 A 3/1985 Ida et al.
(Continued)

FOREIGN PATENT DOCUMENTS

CN 204585420 U 8/2015
EP 1873045 A2 1/2008

OTHER PUBLICATIONS

ISR of PCT/US2017/023972 dated Jun. 6, 2017.

*Primary Examiner* — William R Harp
(74) *Attorney, Agent, or Firm* — Berenato & White, LLC

(57) ABSTRACT

A workpiece processing system is provided that includes a first carousel rotary conveyor associated with a first plurality of stations through which workpieces are successively rotationally conveyed, a second carousel rotary conveyor associated with a second plurality of stations through which the workpieces are successively rotationally conveyed, and an inter-carousel transport configured to selectively operate in a first mode and a second mode. In the first mode, the inter-carousel transport is operable to successively transfer the workpieces from the first carousel rotary conveyor to the second carousel rotary conveyor. In the second mode, the inter-carousel transport is operable to successively reorient the workpieces of a selected one of the first carousel rotary conveyor or the second carousel rotary conveyor by approximately 180 degrees of rotation for further successive rotational conveyance of the workpieces through the stations associated with the selected first or second carousel rotary conveyor.

20 Claims, 11 Drawing Sheets

(51) Int. Cl.
*B23Q 7/14* (2006.01)
*B23Q 7/16* (2006.01)
*B27M 1/08* (2006.01)
*B23Q 39/04* (2006.01)
*B23Q 41/02* (2006.01)

(52) U.S. Cl.
CPC ......... *B23Q 39/042* (2013.01); *B23Q 39/046* (2013.01); *B23Q 41/02* (2013.01); *B27M 1/08* (2013.01)

(58) Field of Classification Search
CPC ........ B23Q 7/165; B23Q 7/14; B65G 47/244; B65G 17/20
USPC ......... 198/478.1, 346.2; 414/223.02, 222.07, 414/222.13
See application file for complete search history.

(56) References Cited

U.S. PATENT DOCUMENTS

| | | | |
|---|---|---|---|
| 4,576,213 A | | 3/1986 | Miller |
| 5,421,072 A | | 6/1995 | Kuban |
| 5,640,756 A | * | 6/1997 | Brown ................. B23P 21/006 29/33 J |
| 5,655,423 A | * | 8/1997 | Nishio ................... B23Q 7/165 82/1.11 |
| 5,832,590 A | * | 11/1998 | Wuerthner ........... B23Q 39/042 29/563 |
| 8,227,345 B2 | | 7/2012 | Matusch |
| 8,561,290 B2 | | 10/2013 | Yamashita et al. |
| 2003/0189085 A1 | | 10/2003 | Kilibarda |
| 2008/0052895 A1 | | 3/2008 | Klemm |

\* cited by examiner

WOOD DOOR SLAB PROCESSING SYSTEM, AND RELATED METHODS

CROSS-REFERENCE TO RELATED APPLICATIONS

This application claims the benefit of priority of U.S. Provisional Application No. 62/425,801 filed Nov. 23, 2016 and U.S. Provisional Application No. 62/312,896 filed Mar. 24, 2016, the complete disclosures of which are incorporated herein by reference.

FIELD OF THE INVENTION

This invention relates to systems and methods for processing solid wood door slabs or workpieces, and in particularly exemplary embodiments relates to systems and methods including one or more carousel rotary conveyors (sometimes referred to in the art as star conveyors) for machining solid wood door slabs or workpieces, especially but not limited to solid wood entryway, passageway doors, solid doors, and hollow core doors.

BACKGROUND

Workpieces, including doors, may be subject to automated processes involving multiple workstations for performing machining and related operations. In the case of door manufacturing, such machining operations may be performed on all six surfaces (front, back, top, bottom, and opposite sides) of the door, and may include, for example, routing hinge and mortise pockets, forming lock holes, drilling pilot holes, and working edges and main surfaces of the door to prepare the door to receive hardware, such as hinges, locks, overhead closers, etc. Applicant has observed that if one of the workstations malfunctions or requires downtime for maintenance, repair, or the like, the productivity of the entire automated process can be significantly impaired.

SUMMARY OF THE INVENTION

A first aspect of the invention provides a workpiece processing system that includes first and second carousel rotary conveyors and an inter-carousel conveyor. The first carousel rotary conveyor is associated with a first plurality of stations configured to successively rotationally convey workpieces through the first plurality of stations. The second carousel rotary conveyor is associated with a second plurality of stations configured to successively rotationally convey the workpieces through the second plurality of stations. The inter-carousel conveyor is configured to selectively operate in a first mode and a second mode. In the first mode, the inter-carousel conveyor is operable to successively transfer the workpieces successively rotationally conveyed through the first plurality of stations from the first carousel rotary conveyor to the second carousel rotary conveyor for successively rotationally conveying the workpieces through the second plurality of stations. In the second mode, the inter-carousel conveyor is operable to successively reorient the workpieces successively rotationally conveyed through the stations associated with a selected one of the first carousel rotary conveyor or the second carousel rotary conveyor by approximately 180 degrees of rotation for further successive rotational conveyance of the workpieces through the stations associated with the selected one of the first carousel rotary conveyor or the second carousel rotary conveyor.

According to a second aspect of the invention, a workpiece processing system is provided that includes first and second carousel rotatory conveyors and an inter-carousel conveyor. The first carousel rotary conveyor includes a first hub with a first rotational axis and a first plurality of arms. The first arms are operable to hold and release workpieces conveyed to and from the first carousel rotary conveyor, and are operatively connected to the first hub to rotate about the first rotational axis and thereby successively rotationally convey the workpieces about the stations associated with the first carousel rotary conveyor. The second carousel rotary conveyor includes a second hub with a second rotational axis, and a second plurality of arms. The second arms are operable to hold and release the workpieces conveyed to and from the second carousel rotary conveyor. The second arms are operatively connected to the second hub to rotate about the second rotational axis and thereby successively rotationally convey the workpieces about the stations associated with the second carousel rotary conveyor. The inter-carousel conveyor is configured to selectively operate in a first mode and a second mode. In the first mode, the inter-carousel conveyor is operable to successively transfer the workpieces successively rotationally conveyed through the stations associated with the first carousel rotary conveyor from the first carousel rotary conveyor to the second carousel rotary conveyor for successively rotationally conveying the workpieces through the stations associated with the second carousel rotary conveyor. In the second mode, the inter-carousel conveyor is operable to successively reorient the workpieces successively rotationally conveyed through the stations associated with a selected one of the first carousel rotary conveyor or the second carousel rotary conveyor by approximately 180 degrees of rotation for further successive rotational conveyance of the workpieces through the stations associated with the selected one of the first carousel rotary conveyor or the second carousel rotary conveyor.

A third aspect of the invention provides a method of processing workpieces. The method involves selectively operating in a first mode and a second mode. In the first mode, workpieces are successively rotationally conveyed through a first plurality of stations associated with a first carousel rotary conveyor, successively transferred by an inter-carousel conveyor to a second carousel rotary conveyor, and successively rotationally conveyed through a second plurality of stations associated with the second carousel rotary conveyor. In the second mode, the workpieces are successively rotationally conveyed through a selected one of the first plurality of stations or the second plurality of stations, successively reoriented by approximately 180 degrees of rotation by the inter-carousel conveyor, and successively conveyed again through said selected one of the first plurality or second plurality of stations.

In each of the above aspects and the exemplary embodiments and methods set forth herein are particularly advantageous for and applicable to door production, especially wood doors made from solid wood slabs.

Other aspects of the invention, including systems, apparatus, devices, assemblies, subassemblies, processes, and the like which constitute part of the invention, will become more apparent upon reading the following detailed description of the exemplary embodiments.

BRIEF DESCRIPTION OF THE DRAWING

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARY EMBODIMENTS AND EXEMPLARY METHODS

Figure 1:
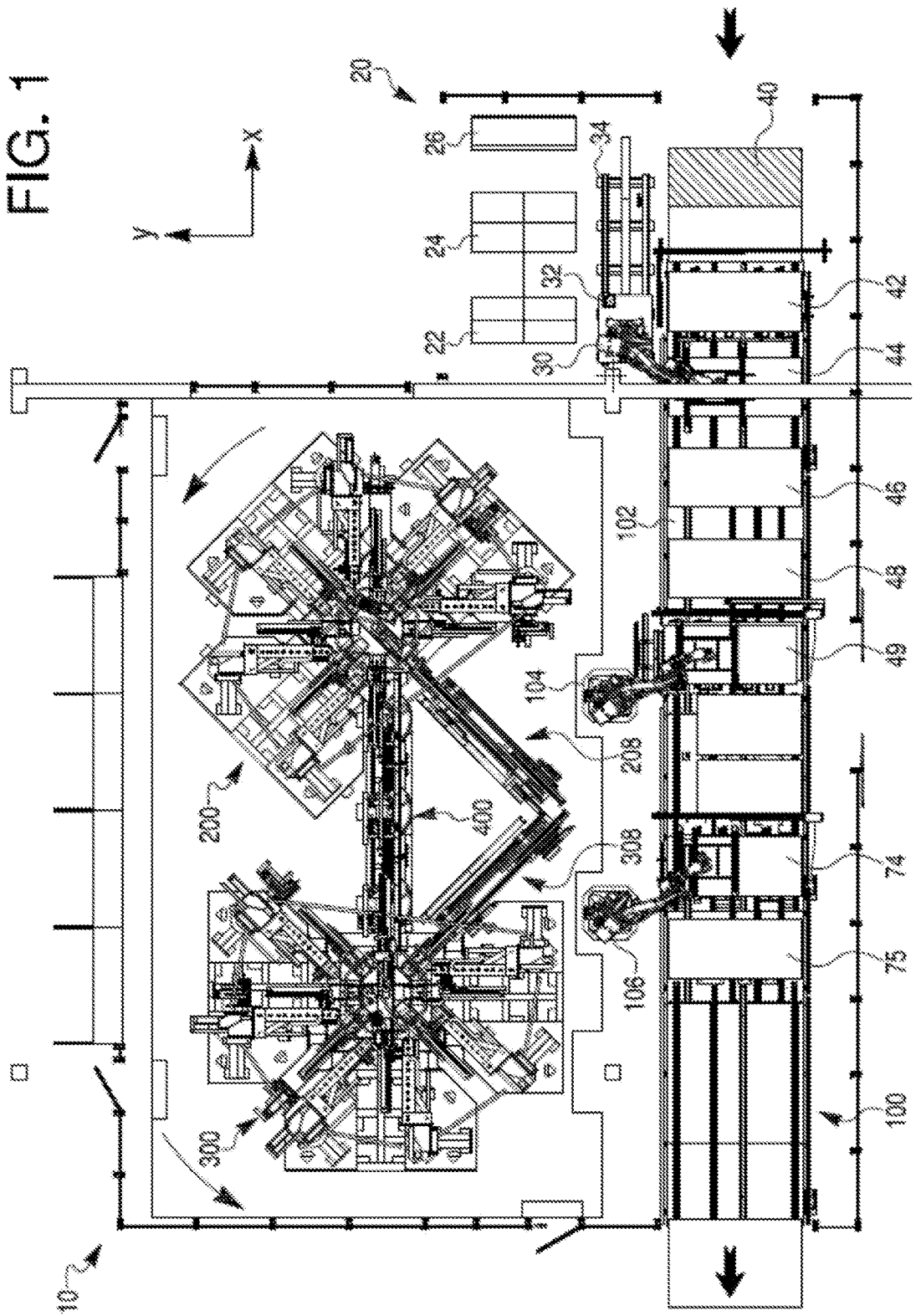
FIG. 1 is a plan production schematic of a system according to an embodiment of the invention.

Reference will now be made in detail to exemplary embodiments and methods of the invention. It should be noted, however, that the invention in its broader aspects is not necessarily limited to the specific details, representative materials and methods, and illustrative examples shown and described in connection with the exemplary embodiments and methods. Like reference characters refer to like parts throughout the drawings.

A workpiece processing system is generally designated by reference numeral 10 in FIG. 1. In its preferred form, the system 10 is used to machine and process doors, in particular solid wood doors or hollow core door. The workpiece processing system 10 includes a destacking station designated by reference numeral 20 in FIG. 1 and shown in greater detail in FIG. 2, an input/output transfer station designated by reference numeral 100 in FIG. 1 and shown in greater detail in FIG. 3, a first carousel rotary conveyor designated by reference numeral 200 in FIG. 1 and shown in greater detail in FIG. 4, a second carousel rotary conveyor designated by reference numeral 300 in FIG. 1 and shown in greater detail in FIG. 5, and an inter-carousel transport (also referred to herein as an inter-carousel conveyor) designated by reference numeral 400 in FIG. 1 and shown in greater detail in FIGS. 6-10.

The destacking station 20 shown in FIG. 1 includes stacks of cardboard with various sizes, typically over 3 ft×7 ft, or other cushioning material 22 and 24 which will be positioned to sit under the workpieces (such as doors). The stacked workpieces are typically doors that have not been processed. Reference numeral 40 represents a stack of workpieces delivered to the system, such as offloaded from a vehicle by a forklift or transferred by conveyor from another section of the manufacturing plant.

A robot 30 is mounted on a platform 32 that forms a base on which the robot 30 rests. A conveyor or parallel linear guides 34 are provided under and slidably support the platform 32 and the robot 30. The platform 32 with the robot 30 is slidable reciprocatingly (back and forth) along the x-axis (see FIG. 1) along the guides 34.

Figure 2:
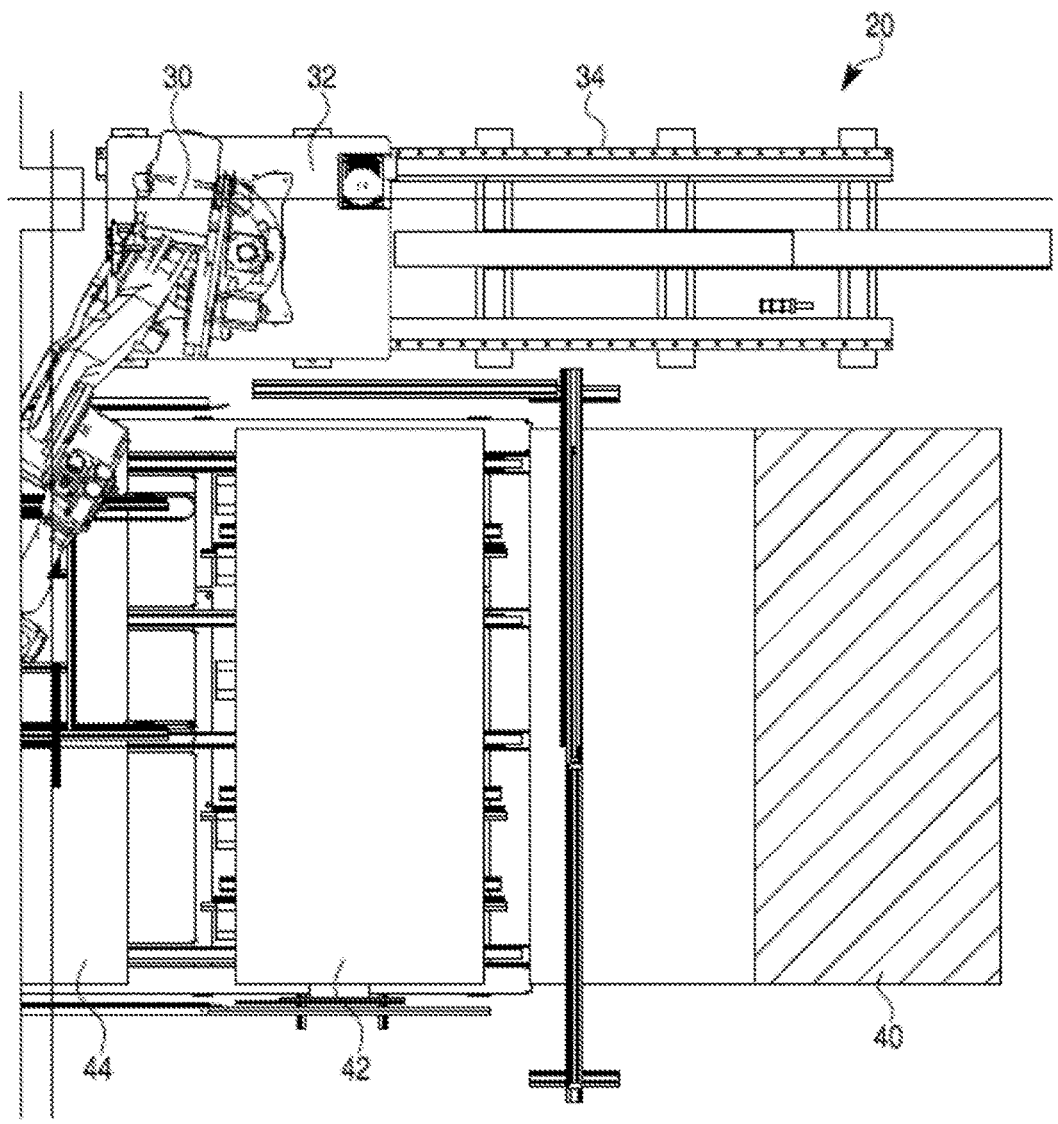
FIG. 2 is an enlarged fragmentary view of an embodiment of a destacking station of the system of FIG. 1.

Mechanisms suitable for use as the robot 30 are known in the art. The robot 30 selects a cardboard member from one of the stacks 22 and 24 when the processing order demands a cardboard larger than the regular 3 ft×7 ft cardboard. When the processing order demands cardboard that is 3 ft×7 ft the cardboard will be loaded from robot 30, FIGS. 1 and 2. In the illustrated embodiment, the cardboard members of stacks 22 and 24 have different lengths and widths. The stack 22 or 24 from which the cardboard member is selected may be determined by matching the size of the cardboard members of stack 22 or 24 to the size of the workpieces in the workpiece stack 40. The robot 30 positions the cardboard on the surface of a linear transfer conveyor 102 (e.g., conveyor belt) at a location corresponding to where the workpiece 44 is shown in FIGS. 1 and 2. The linear transfer conveyor 102 moves the cardboard member to the left in FIGS. 1 and 2 to a position corresponding to workpiece stack 49. It should be understood that the cardboard stacks 22 and 24 may be relocated to other areas of the system 10, including in close proximity to second robot 106 (discussed below) to allow the second robot 106 (rather than robot 30) to select the cardboard member.

Although not shown, the system 10 may include a barcode reader for reading barcodes on the workpieces. The barcode reading is performed at the location corresponding to workpiece 42. The barcode scanned by the barcode reader is processed by the system to determine features and specifications to be machined/milled into the workpieces.

To move the workpieces from stack 40 onto the linear transfer conveyor 102, the platform 32 slides (to the right in FIG. 1) along the guides 34 along the x-axis, thereby moving the robot 30 with the platform 32 to a position at which the robot 30 can pick up one or more workpieces from stack 40. After picking up one or more workpieces, the platform 32 with the robot 30 thereon slides in the opposite direction (to the left in FIG. 1) parallel to the x-axis to position the robot 30 at a location from which the robot 30 can place the workpiece on the linear transfer conveyor 102 at a position corresponding to the location of workpiece 42. The robot 30 then releases the workpiece. The robot 30 and the platform 32 are reciprocatingly moved back and forth along the guides 34 as the robot 30 transfers workpieces one at a time from the workpiece stack 40 to the position corresponding to that occupied by workpiece 42 on the linear transfer conveyor 102.

Figure 3:
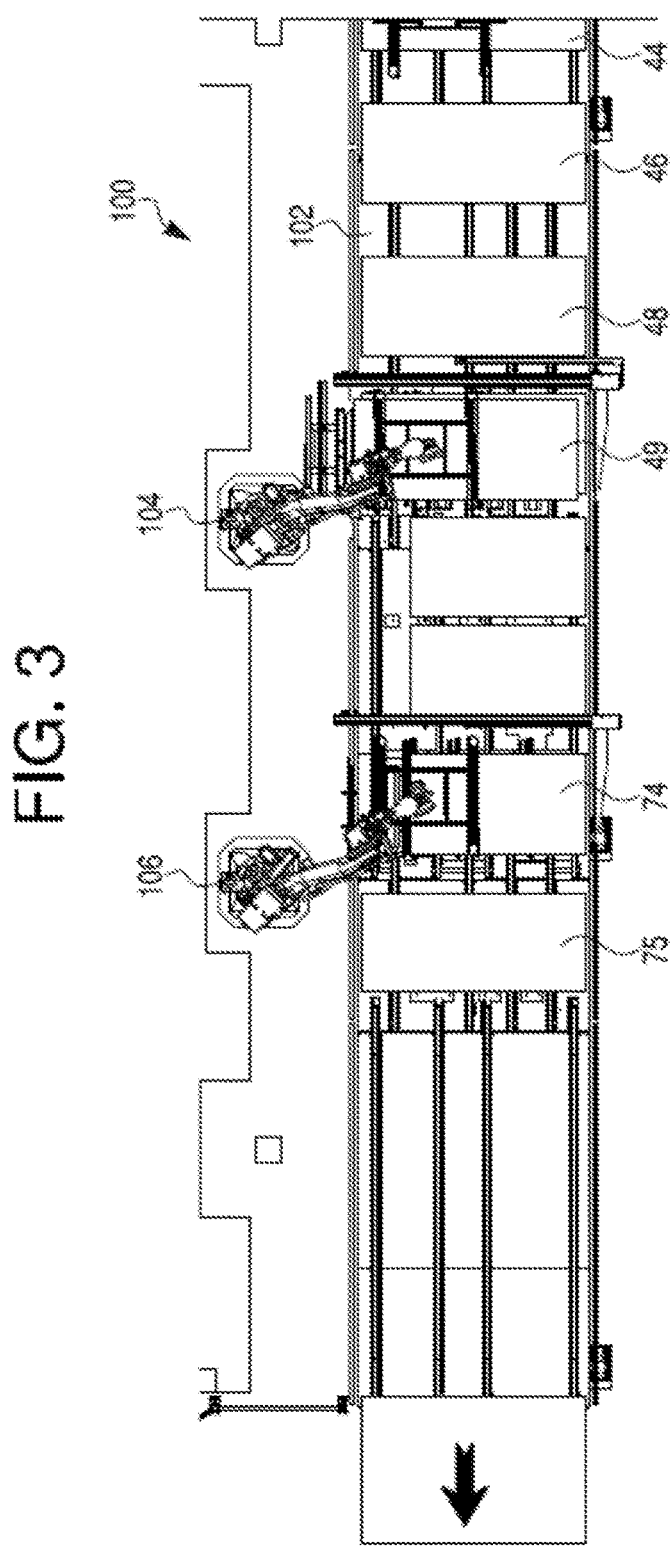
FIG. 3 is an enlarged fragmentary view of an embodiment of a linear transfer conveyor with associated robots of the system of FIG. 1.

In FIGS. 1 and 3, workpieces 42, 44, 46, 48, and 49 have been individually destacked by the robot 30 from the workpiece stack 40 and successively transferred onto the linear transfer conveyor 102. After each loading operation, the linear transfer conveyor 102 moves the workpieces thereon to the left (parallel to the x-axis) in FIGS. 1 and 3. For example, the robot 30 deposits a first workpiece from the workpiece stack 40 onto the linear transfer conveyor 102 at a position corresponding to that occupied by the workpiece 42 in FIGS. 1 and 3. As the robot 30 returns to the workpiece stack 40 to clampingly acquire a second workpiece, the linear transfer conveyor 102 moves the first workpiece to the left in FIG. 1 from a position corresponding to that occupied by the workpiece 42 to a position corresponding to that occupied by the workpiece 44 in FIGS. 1 and 3. The robot 30 then deposits the second workpiece obtained from the workpiece stack 40 at a position corresponding to that occupied by the workpiece 42 in FIGS. 1 and 3. As the robot 30 again returns to the workpiece stack 40 to clampingly engage a third workpiece, the linear transfer conveyor 102 moves the first and second workpieces to the left in FIG. 1 into positions corresponding to workpieces 46 and 44, respectively. The robot 30 then deposits the third workpiece onto the linear transfer conveyor 102 at a position corresponding to 42 in FIGS. 1 and 2. The workpieces 42, 44, 46, 48, 49 are preferably moved successively and intermittently relative to one another in this manner. This process is repeated until the loaded workpiece stack 40 is depleted of workpieces. The destacking of the workpieces from the workpiece stack 40 to the transfer conveyor 102 may be performed automatically or manually.

Disposal pile 26 represents a disposal area for used cardboard under the workpiece stack 40 delivered to the system 10. After the workpiece stack 40 has been depleted of workpieces, the robot 30 transports the cardboard piece under the workpiece stack 40 to disposal pile 26.

The robots used may include various devices for clamping/gripping workpieces, cardboard, and other materials, including clamps, grips, a vacuum feature for the cardboard members, etc. The robot 30 uses its clamps, grips, etc. to firmly and securely grip and hold the workpieces, preferably one at a time, and lift the workpieces from the stack 40. The robot 30 lowers the workpieces onto the transfer conveyor 102, maintaining the workpieces in a horizontal orientation. An alignment mechanism may push against one end of the workpieces loaded onto the transfer conveyor 102, thereby causing the workpieces to abut against an alignment bar (e.g., a guiderail of the linear transfer conveyor 102) to align the workpieces with one another. (The workpieces as delivered in the stack 40 are not necessarily aligned with one another when received by the system.) The workpieces are released by the robot 30 onto the transfer conveyor 102 in a known fashion, e.g., by de-clamping, de-gripping, etc.

The input/output transfer station 100 further includes a first robot 104 and a second robot 106. The first and second robots 104, 106 may be embodied as automatically operating robots with clamping/gripping mechanisms similar to those discussed above with respect to the robot 30. Robot 106 also may include a vacuum mechanism to manage the cardboards for stacking. Although the drawings depict first and second robots 104, 106, it should be understood that the system 10 may use one robot for performing the functions of both of the robots 104 and 106. Alternatively, the system 10 may include additional robots, e.g., three, four, five, six, or more, for loading and unloading workpieces to and from the first and second carousel rotary conveyors 200, 300.

Before the first robot 104 picks up a workpiece, a set of mechanical arms at position 49 measures the length and width of the door. Also a camera system measures the thickness and bevel degree of each workpiece. These measurements are communicated to a processing unit and occur while the robot 104 prepares to pick up the workpiece. This is to ensure that the machining/milling features and specifications read from the barcode matches the dimensions of the workpiece and avoid damaging the entire system. In the event that the workpiece dimensions do not match the "recipe"/specifications from the barcode, the robot 104 will pick up the door and move it to a reject frame to be later removed by the operators.

In the illustrated embodiment, the first robot 104 is configured to separately clamp one horizontally oriented workpiece at a time from the position corresponding to workpiece 49. After the workpiece 49 is clamped and removed from the transfer conveyor 102 by the first robot 104, the transfer conveyor 102 advances the next workpiece 48 to the position occupied by the workpiece 49 in FIGS. 1 and 3. The first robot 104 is configured to reorient the workpiece into a vertical position in which the opposite ends of the workpiece face upwards and downwards, respectively, and the opposite major surfaces of the workpiece extend in planes that are generally parallel to the arm 204 that will receive the workpiece. As discussed further below, the first robot 104 places the vertically oriented workpiece on a shuttle 208. Similarly, the second robot 106 is configured to separately clamp the workpieces in their vertical orientations, as received from a shuttle 308 associated with the second carousel rotary conveyor 300 (e.g., at station 306*h* in FIG. 5), and reorient the workpieces into a horizontal position for positioning back on the transfer conveyor 102 at a position occupied in FIGS. 1 and 3 by workpiece 74, downstream from the location occupied by workpiece 49 at which the first robot 104 clamping receives the workpieces for loading to the first carousel rotary conveyor 200.

In a first mode of operation (discussed further below), the linear transfer conveyor 102 is used for delivering workpieces to a position corresponding to that occupied by workpiece 49 for pickup by the first robot 104 and receiving machined workpieces at a position corresponding to that occupied by workpiece 74 from the second robot 106. In the second mode of operation (discussed further below), machining is conducted at either the first carousel rotary conveyor 200 or the second carousel rotary conveyor 300. If the first carousel rotary conveyor 200 is selected in the second mode of operation, the first robot 104 picks up pre-processed workpieces from the linear transfer conveyor 102 at a position corresponding to that occupied by workpiece 49, delivers the pre-processed workpieces to the first carousel rotary conveyor 200, and receives processed/milled workpieces processed by the first carousel rotary conveyor 200 for delivery back to the linear transfer conveyor 102, typically at a position downstream relative to that occupied by the workpiece 49. If the second carousel rotary conveyor 300 is selected in the second mode of operation, the second robot 106 picks up pre-processed workpieces from the linear transfer conveyor 102 at a position corresponding to that occupied by workpiece 74, delivers the pre-processed workpieces to the second carousel rotary conveyor 300, and receives processed/milled workpieces processed by the second carousel rotary conveyor 300 for delivery back to the linear transfer conveyor 102, typically at a position occupied by the workpiece 75 in FIG. 1. Although FIG. 1 shows a single linear transfer conveyor 102, it should be understood that two, three or more linear transfer conveyors may be used.

As noted above, the system 10 includes the first and second carousel rotary conveyors 200 and 300 and the inter-carousel transport/conveyor 400 positioned between the carousel rotary conveyors 200 and 300. The inter-carousel conveyor 400 is selectively operable in a first mode and a second mode. The first and second modes of operation of the inter-carousel conveyor 400 and the interaction of the inter-carousel conveyor 400 in each mode with the first and/or second carousel rotary conveyors 200 and 300 are discussed in greater detail below.

Figure 4:
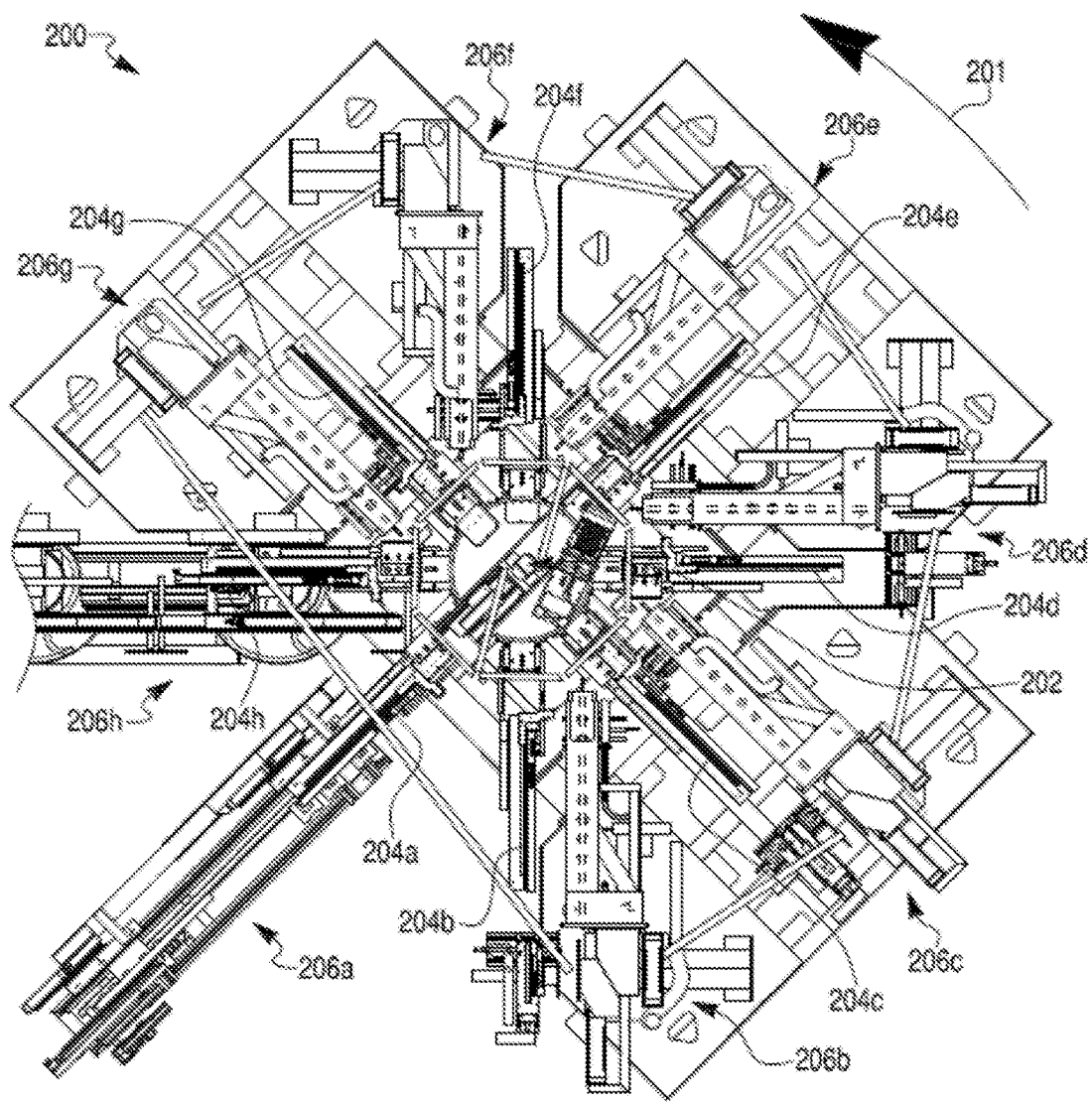
FIG. 4 is an enlarged fragmentary view of an embodiment of a first carousel rotary conveyor of the system of FIG. 1.

Referring more particularly to FIG. 4, the first carousel rotary conveyor 200 includes a rotatable first hub 202 with a first rotational axis, which is vertical in the illustrated embodiment. The first carousel rotary conveyor 200 further includes a plurality of first arms 204*a*-204*h*. The first arms 204*a*-204*h* are sometimes individually and collectively referred to hereinafter by reference numeral 204 for the sake of brevity and simplification of description. In the illustrated embodiment, the first carousel rotary conveyor 200 has eight (8) of the first arms 204. It should be understood that the first carousel rotary conveyor 200 may have a different number of the first arms 204, e.g., one, two, three, four, five, six, seven, or more.

In the illustrated embodiment, the first arms 204 extend radially relative to the first vertical rotational axis. The first arms 204 are operatively connected to the first hub 202 to rotate along a counterclockwise direction 201, typically in unison with one another, about the first rotational axis.

The first arms 204 are operable to grasp, hold, and release workpieces conveyed to and from the first carousel rotary conveyor 200. The first arms 204 may be provided with gripper (or clamping) sets, as discussed above, or other holding and releasing mechanisms. In the illustrated embodiment, the first arms 204 hold the workpieces in a vertical orientation, with the opposite major surfaces of the workpieces extending in planes generally radial to the first rotational axis. The gripper/clamping sets or other holding/ releasing mechanism preferably grips or clamps opposite side edges of the workpieces. The first arms 204 preferably are operable independently of one another to grip and release the workpieces conveyed to and from the first carousel rotary conveyor 200. For example, in the state of operation shown in FIG. 4, the first arm 204a may engage a gripping action with respect to one of the workpieces, while simultaneously the first arms 204b-204g maintain a gripping action on their respective workpieces for machining operations and the first arm 204h releases its grip on its respective workpiece. Further operation of the first carousel rotary conveyor 200 is discussed in greater detail below.

The first carousel rotary conveyor 200 is associated with a first plurality of stations 206a-206h through which the workpieces are successively rotationally conveyed or "indexed" by the first arms 204a-204h. As the arms 204a-204h rotate about the first hub 202 counterclockwise, each arm 204a-204h will travel through each of the stations 206a-206h. The first plurality of stations (or first stations) 206a-206h are sometimes individually and collectively referred to hereinafter by reference numeral 206 for the sake of brevity and simplification of description. In the illustrated embodiment, the first carousel rotary conveyor 200 is associated with eight (8) of the first stations 206. It should be understood that the first carousel rotary conveyor may have a different number of the first stations 206, e.g., one, two, three, four, five, six, seven, or more of the first stations 206. Preferably, the number of first stations 206 equals the number of first arms 204.

In the first mode of operation, the first station 206a is a loading or transfer-in station for receiving workpieces fed from the first robot 104 to the first carousel rotary conveyor 200. The robot 104 picks up workpieces from a location corresponding to that occupied by the workpiece 49 in FIG. 1. The robot 104 places the workpiece in a vertical orientation on the shuttle 208. The shuttle 208 clamps the bottom part of the workpiece while the workpiece is still held by the robot 104. Once the shuttle 208 has clampingly secured the workpiece, the first robot 104 releases the workpiece, and the shuttle 208 with the clamped workpiece travels along the ground diagonally (relative to the first hub 202) toward the first station 206a. At the first station 206a, the grippers of the arm 204 associated with the first station 206a (i.e., first arm 204a in the state of operation shown in FIG. 4) engage the workpiece for indexing. After the first arm 204a has grippingly engaged the workpiece, the shuttle 208 releases the workpiece and returns in a reciprocating manner to its original location near the first robot 104 to receive the next workpiece from the first robot 104. The arm 204a rotates to move the workpiece counterclockwise about the first hub 202 to the second station 206b. As a result of this counterclockwise rotation, the first arm 204h moves from the first station 206h to the first station 206a to receive the next workpiece delivered by the reciprocating shuttle 208.

In the state of operation shown in FIG. 4, the workpieces respectively held by the first arms 204a, 204b, 204c, 204d, 204e, 204f, 204g, and 204h are respectively associated with first stations 206a, 206b, 206c, 206d, 206e, 206f, 206g, and 206h. The rotational movement of the first hub 202 of the first carousel rotary conveyor 200 successively rotationally conveys the first arms 204 in a circular path through the first stations 206 so that the workpieces held by the first arms 204 are successively indexed through each of the first stations 206 associated with the first carousel rotary conveyor 200. The direction of rotation is counterclockwise in FIG. 4, as indicated by arrow 201. The rotational conveyance of the first arms 204 and associated workpieces in the counterclockwise direction 201 is preferably intermittent, whereby rotational conveyance of the workpieces and the first arms 204 relative to the first stations 206 is stopped when each workpiece reaches its succeeding (next) first station 206 and is temporarily retained at that station for a particular period of time so that one or more machining operations associated with that station can be performed on the workpiece. Thus, with reference to FIG. 4, the workpieces held by the first arms 204a, 204b, 204c, 204d, 204e, 204f, and 204g in stations 206a, 206b, 206c, 206d, 206e, 206f, and 206g will be rotationally moved to a successive indexing stage so as to be associated with the succeeding stations 206b, 206c, 206d, 206e, 206f, 206g, and 206h, respectively, for further processing in those succeeding stations.

The first workstations 206b-206g in FIG. 4 are referred to herein as first workstations or first tooled workstations. Each first workstation 206b-206g includes one or more associated tools for machining the workpieces. The tool(s) included at the first tooled workstations 206b-206g may include, for example, routers, drills, and/or other tools typically used for machining/milling wood.

The machining operations performed at the first tooled workstations 206b-206g may include, for example, routing and/or drilling, such as routing hinge pockets, lock holes, and/or mortise pockets from the side edges of the door for receipt of hinge and lock hardware, drilling pilot holes for receiving screws or other fasteners of the hardware, routing and/or drilling pilot holes in the top and/or bottom of the door for receiving overhead closers and the like, and routing and/or machining openings into which windows, sometimes known as lites, are to be received. Typically, only one side edge or face of the workpiece is machined in the first workstations 206b-206g. The side edge machined by the first tooled workstations 206b-206g is typically the side edge farther away from the first hub 202.

The machining operations desirably may be programmed machining operations that operate automatically. The machining operations are divided among the workstations 206b-206g to improve or optimize throughput of workpieces. For machining operations that involve large amounts of time, e.g., routing of a deep pocket, the machining operation may be divided between two or more of the workstations 206b-206g, for example, with a first half of the deep pocket routed at one of the workstations (e.g., 206b) and the second half of the deep pocket routed at a downstream workstation (e.g., 206c).

The station 206h operates as an unloading or transfer-out station in the first mode of operation for successively and intermittently transferring workpieces (after having been received by station 206a and subject to the machining or other operations of workstations 206b-206g) to the inter-carousel conveyor 400. In exemplary embodiments, the workpieces are maintained in their vertical orientations during the transfer operation and are transferred from the station 206h to the inter-carousel conveyor/transport 400 one workpiece at a time for transport to the second carousel rotary conveyor 300 as part of the first mode operation.

Figure 5:
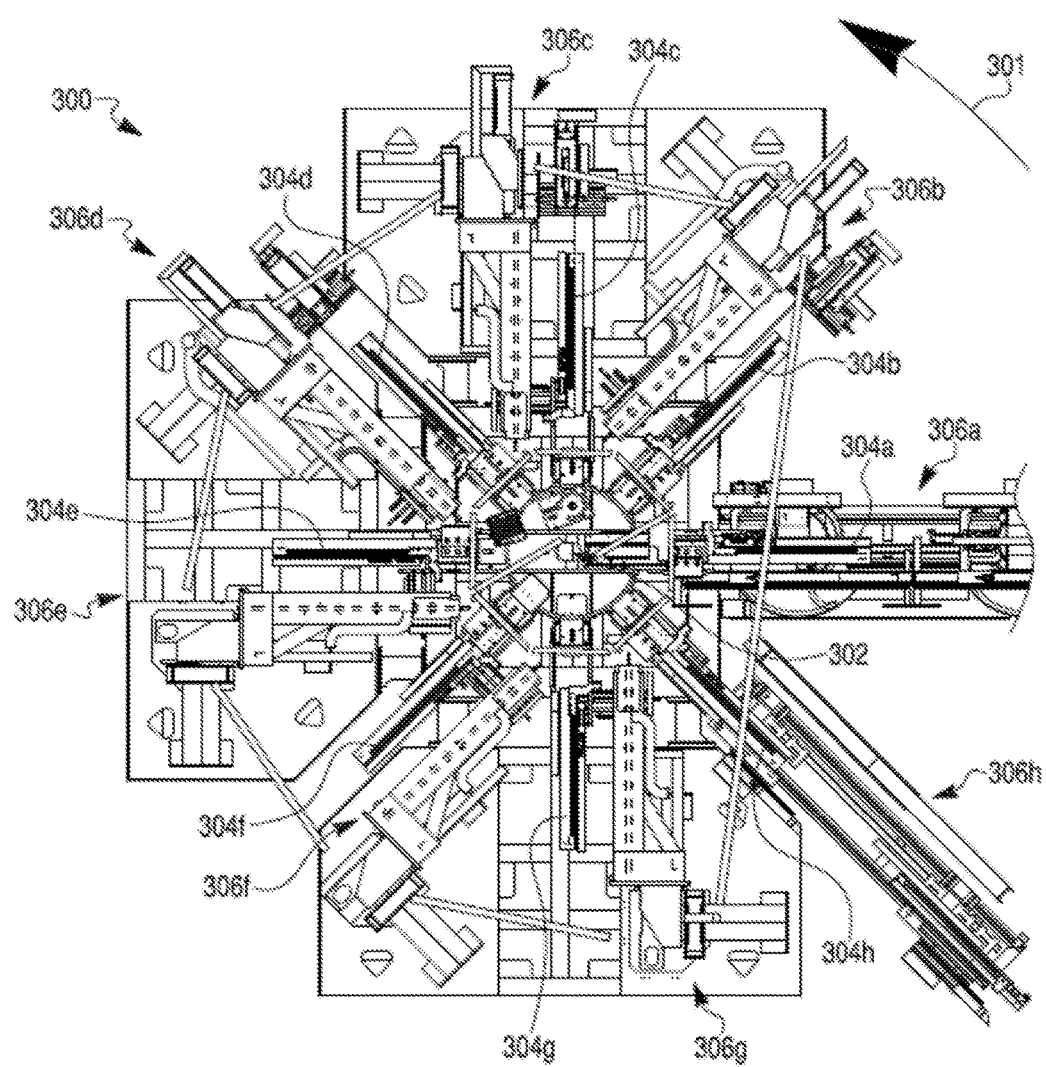
FIG. 5 is an enlarged fragmentary view of an embodiment of a second carousel rotary conveyor of the system of FIG. 1.

The second carousel rotary conveyor 300 operates in much the same manner as the first carousel rotary conveyor 200. As shown in FIG. 5, the second carousel rotary conveyor 300 includes a rotatable second hub 302 with a second rotational axis, which is vertical and spaced apart from the first rotational axis in the illustrated embodiment. The second carousel rotary conveyor 300 includes a plurality of second arms 304a-304h. The second arms 304a-304h are sometimes individually and collectively referred to hereinafter by reference numeral 304 for the sake of brevity and simplification of description. In the illustrated embodiment, the second carousel rotary conveyor 300 has eight (8) of the second arms 304. It should be understood that the second carousel rotary conveyor 300 may have a different number of the second arms 304, e.g., one, two, three, four, five, six, seven, or more.

In the illustrated embodiment, the second arms 304 extend radially relative to the second vertical rotational axis. The second arms 304 are operatively connected to the second hub 302 to rotate along a counterclockwise direction 301, typically in unison with one another, about the second rotational axis.

The second arms 304 are operable to grasp, hold and release workpieces conveyed to and from the second carousel rotary conveyor 300. The second arms 304 may be provided with gripper or clamping sets, as discussed above, or other holding and releasing mechanisms. In the illustrated embodiment, the second arms 304 hold the workpieces in a vertical orientation, with the opposite major surfaces of the workpieces extending in planes generally radial to the second rotational axis. The gripper sets or other holding/releasing mechanism preferably grips or clamps opposite side edge of the workpieces. The second arms 304 preferably are operable independently of one another to grip and release the workpieces conveyed to and from the second carousel rotary conveyor 300. For example, in the state of operation depicted in FIG. 5, the second arm 304a may engage a gripping or clamping action with respect to one of the workpieces received from the inter-carousel transport 400 when operating in the first mode. Simultaneously the second arms 304b-304g maintain a gripping or clamping action on their respective workpieces for machining operations. The second arm 304h releases its grip on its respective workpiece after the workpiece is received and gripped by the shuttle 308 for delivery to the second robot 106. More detailed operation of the second carousel rotary conveyor 300 is discussed in greater detail below.

The second carousel rotary conveyor 300 is associated with a second plurality of stations 306a-306h through which the workpieces are successively rotationally conveyed or "indexed." The second plurality of stations (or second stations) 306a-306h are sometimes individually and collectively referred to hereinafter by reference numeral 306 for the sake of brevity and simplification of description. In the illustrated embodiment, the second carousel rotary conveyor 300 is associated with eight (8) of the second stations 306. It should be understood that the second carousel rotary conveyor 300 may have a different number of the second stations 306, e.g., one, two, three, four, five, six, seven, or more of the second stations 306. Preferably, the number of second stations 306 equals the number of second arms 304.

In the state of operation shown in FIG. 5, the workpieces respectively held by the second arms 304a, 304b, 304c, 304d, 304e, 304f, 304g, and 304h are respectively associated with second stations 306a, 306b, 306c, 306d, 306e, 306f, 306g, and 306h. The rotational movement of the second hub 302 of the second carousel rotary conveyor 300 successively rotationally conveys the second arms 304 in a circular path through the second stations 306 so that the workpieces held by the second arms 304 are indexed through each of the second stations 306 associated with the second carousel rotary conveyor 300. The counterclockwise direction of rotation is shown in FIG. 5 by arrow 301. The counterclockwise conveyance in direction 301 is preferably intermittent, whereby rotational conveyance of the workpieces by the second arms 304 relative to the second stations 306 is stopped when each workpiece reaches its succeeding (next) second station 306 and is temporarily retained at that station for a particular time period so that one or more machining operations associated with that station can be performed on the workpiece. Thus, with reference to FIG. 5, the workpieces held by the second arms 304a, 304b, 304c, 304d, 304e, 3064, and 304g will be rotationally and intermittently moved by a single indexing stage so as to be associated with the succeeding second stations 306b, 306c, 306d, 306e, 306f, 306g, and 306h, respectively.

When the inter-carousel transport 400 is in its first mode of operation, the second station 306a operates as a loading or transfer-in station for successively and intermittently receiving workpieces transferred to the transfer-in second station 306a by the inter-carousel transport 400, which as described above receives the workpieces from the transfer-out first station 206h in the first mode of operation. In exemplary embodiments, the workpieces are maintained in their vertical orientations during the transfer operation and are transferred from the inter-carousel conveyor 400 to the transfer-in station 306a one workpiece at a time. For example, in the state of operation shown in FIG. 5, the workpiece transferred from the inter-carousel conveyor 400 to the second station 306a is received by the second arm 304a. The second arm 304a grips the workpiece, after which the inter-carousel conveyor 400 releases the workpiece and returns to the first carousel conveyor 200. The second arm 304a with the workpiece gripped thereto is then successively rotated counterclockwise for intermittent machining in each of second workstations 306b-306g, with the second arm 304a and its gripped workpiece stopping at each second workstation intermittently for a predetermined interval to allow a machine operation to be carried out on the workpiece. After the second arm 304a has indexed the workpiece through each of the second workstations 306a-306g, the second arm 304a rotates the workpiece to station 306h, where the workpiece is transferred to the second shuttle 308. The second shuttle 308 grips the processed workpiece, such as along the bottom edge of the processed workpiece, after which the second arm 304a releases the processed workpiece. The second arm 304a then returns to station 306a to receive another workpiece from the inter-carousel transport 400 operating in the first mode of operation.

The second stations 306b-306g in FIG. 5 are referred to herein as second workstations or second tooled workstations. Each second tooled workstation 306b-306g includes one or more associated tools for machining the workpieces. The tool(s) included at the second workstations 306b-306g may include, for example, routers, drills, etc.

The machining operations performed at the second tooled workstations 306b-306g may include, for example, routing and/or drilling, such as routing hinge pockets, lock pockets, and/or mortise pockets from the side edges of the door for receipt of hinge and lock hardware, drilling pilot holes for receiving screws or other fasteners of the hardware, and routing and/or drilling pilot holes in the top and/or bottom of the door for receiving overhead closers and the like. Typically, only one side edge of the workpieces is machined in the second workstations 306b-306g. The side edge machined by the second tooled workstations 306b-306g is typically the side edge that is farther away from the second hub 302, and is opposite to the side edge that has been machined by the first tooled workstations 206b-206g.

The machining operations are divided among the workstations 306b-306g to improve or optimize throughput of workpieces. The machining operations desirably are programmed machining operations that operate automatically. For machining operations that involve large amounts of time, e.g., routing of a deep pocket, the machining operation may be divided between two or more of the workstations 306b-306g, for example, with a first half of the deep pocket routed at one of the workstations (e.g., 306b) and the second half of the deep pocket routed at a downstream workstation (e.g., 306c). Alternatively, such machining operations of a particular feature (e.g., pocket or hole) may be split between at least one of the first workstations 206b-206g and at least one of the second workstations 306b-306g.

A controller may be provided for controlling the operations of each station 206 and 306. The controller may be connected (wired or wireless) to a user interface from which the user can, for example, select between first and second modes of operation and optionally modify the machining parameters and settings of each of the workstations.

The second station 306h operates as an unloading or transfer-out station in the first mode of operation. The second arm (e.g., arm 304h) associated with the transfer-out second station 306h in the state of operation shown in FIG. 5 transfers the processed workpiece to the second shuttle 308, which for example may grip the processed workpiece from its bottom. The second arm 304h maintains its grip on the workpiece until the second shuttle 308 has secured the workpiece. The second arm 304h then releases its grip on the workpiece and rotates counterclockwise to station 304a to receive another workpiece from the inter-carousel conveyor 400. The second shuttle 308 moves diagonally away from the second hub 302 to the second robot 106 while maintaining the workpiece in the vertical orientation. The second shuttle 308 then releases the workpiece after the grippers or clamping mechanisms of the second robot 106 have secured the workpiece for subsequent conveyance by the second robot 106 to the transfer conveyor 102. The second shuttle 308 then returns to the second station 306h to receive the next processed workpiece from station 304h. The second shuttle 308 may reciprocatingly move along the ground back and forth between the second robot 106 and the second station 306h associated with the second carousel rotary conveyor 300. As the workpiece travels in the shuttle 308, the workpiece passes between a set of air nozzles mounted on a frame. Air from the nozzles removes excessive dust that can damage the surface of the workpieces.

The second robot 106 picks up cardboard from a stack (not shown) places it at a position corresponding to that occupied by workpiece 74 before receiving the workpieces from the second shuttle 308 for placement on the cardboard. In the illustrated embodiment, the second robot 106 is configured to separately and intermittently clampingly receive the workpieces from the second shuttle 308, reorient the workpieces from their vertical orientations to horizontal orientations, and set the horizontally oriented workpieces onto the cardboard on the transfer conveyor 102, for example, at a position corresponding to that occupied by the workpiece 74 in FIG. 3. In FIG. 3, the workpiece 75 represents a workpiece that was unloaded from the second carousel rotary conveyor 300 by the second shuttle 308 and the second robot 106 and advanced one intermittent movement by the transfer conveyor before workpiece 74 was handled by the second robot 106.

Figure 6:
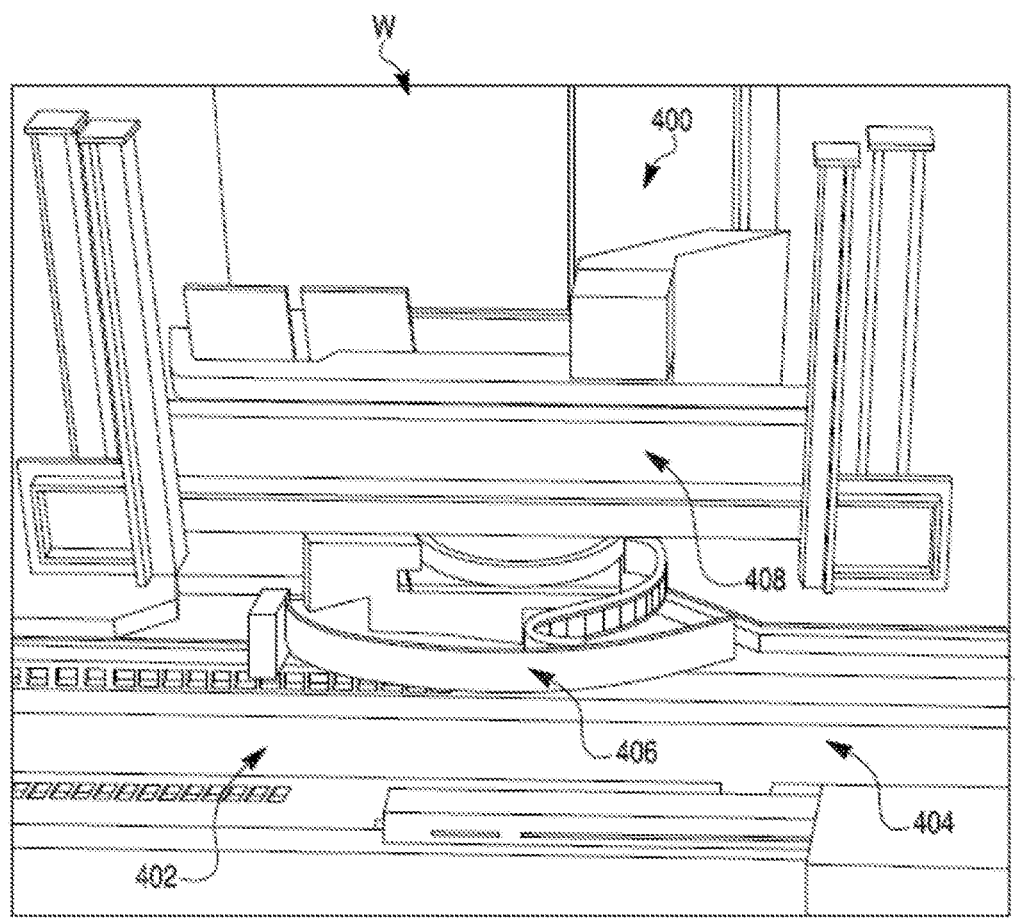
FIG. 6 is an enlarged fragmentary, side perspective view of an embodiment of an inter-carousel conveyor of the system of FIG. 1.
Figure 7:
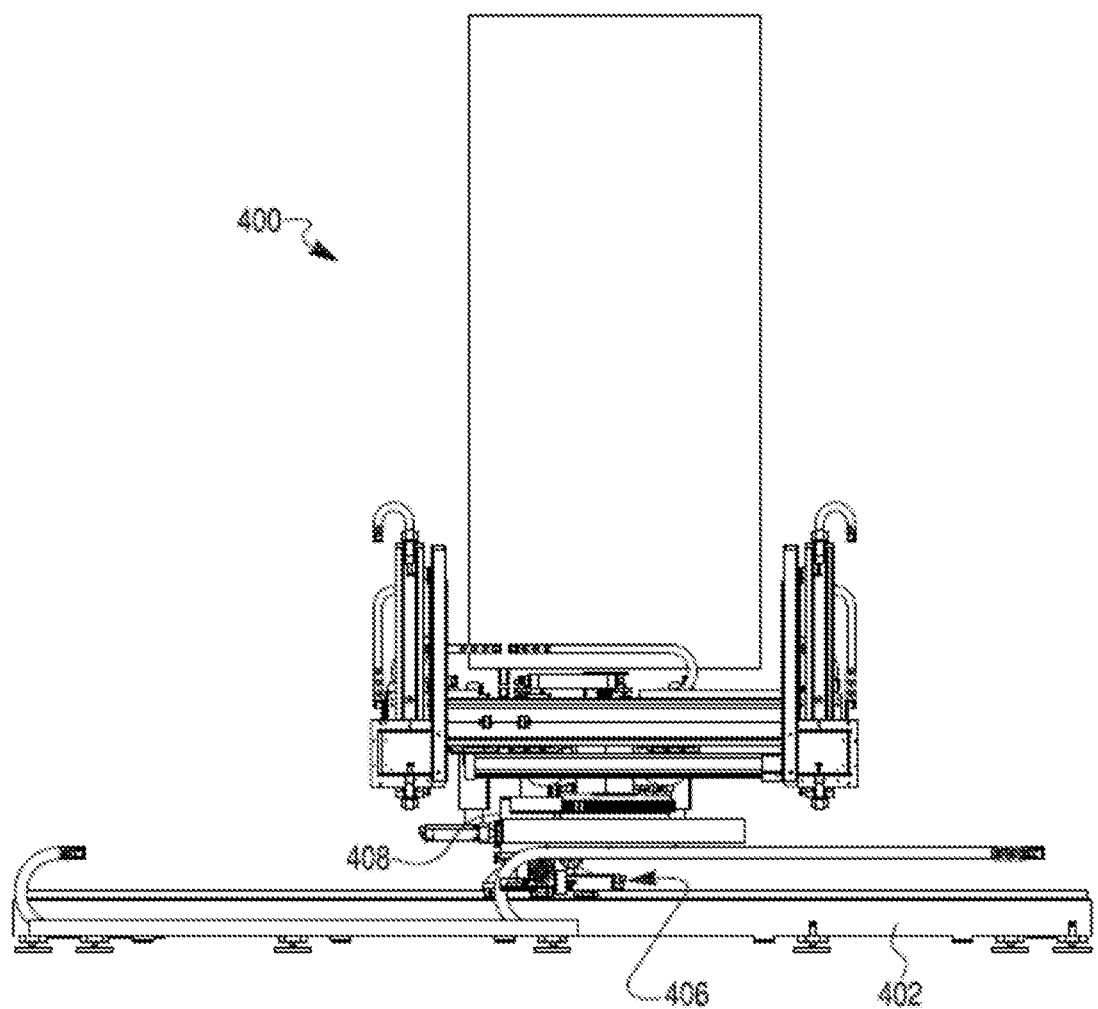
FIG. 7 is a side view of the inter-carousel conveyor.
Figure 8:
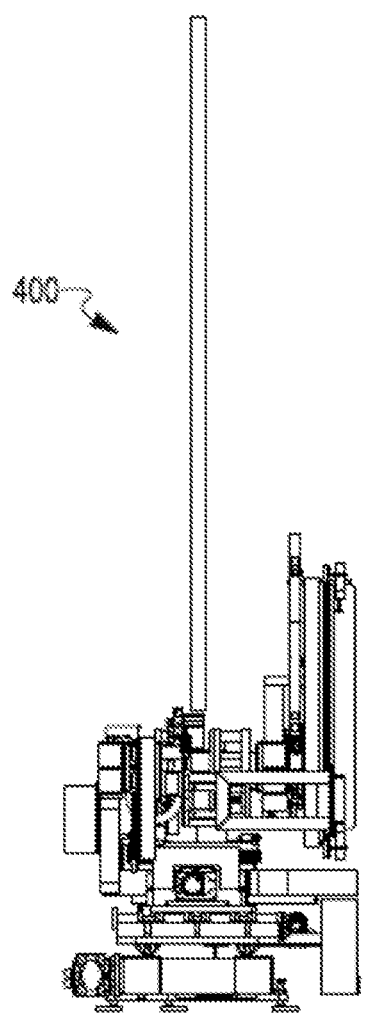
FIG. 8 is an end view of the inter-carousel conveyor.
Figure 9:
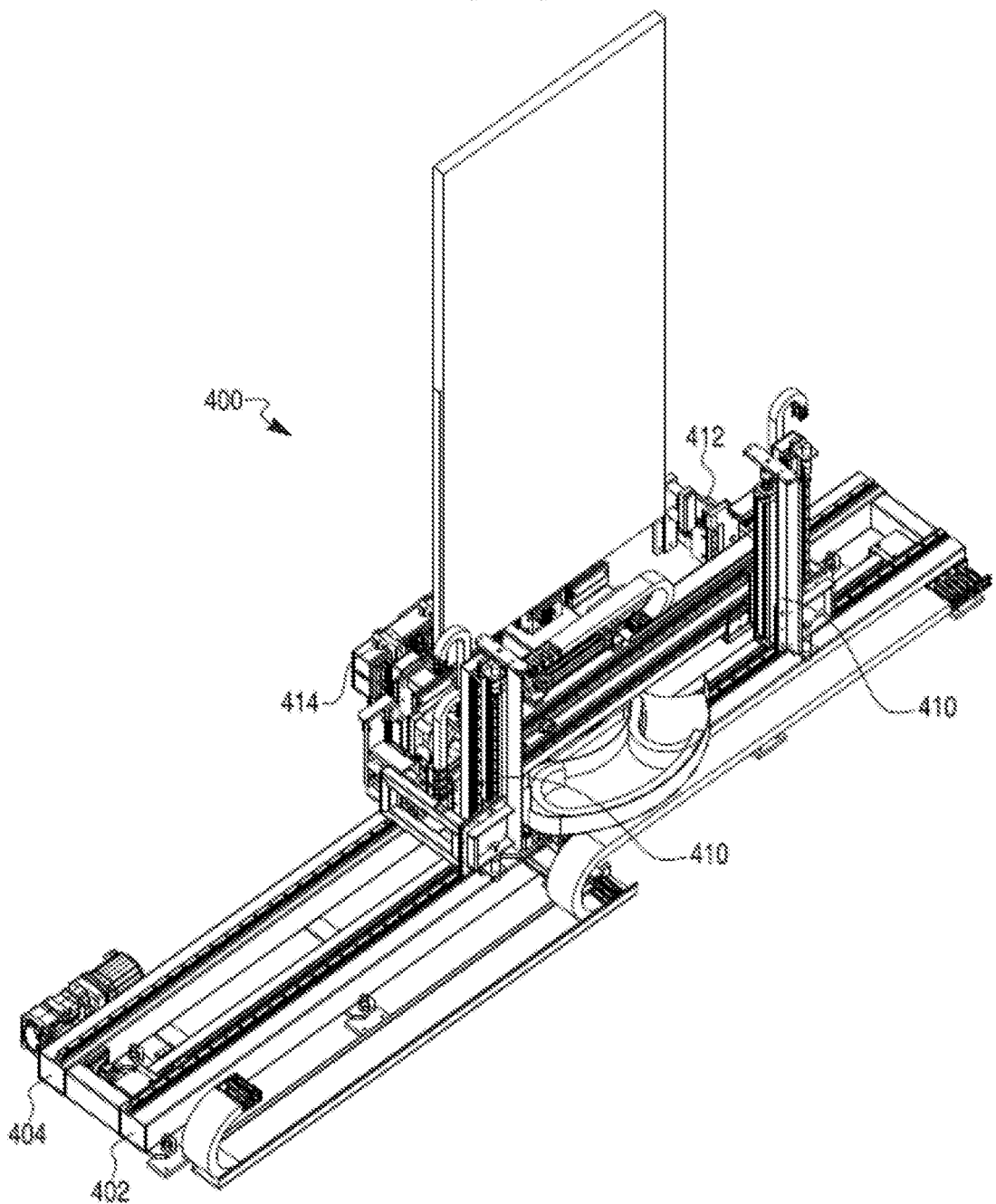
FIG. 9 is a perspective view of the inter-carousel conveyor.
Figure 10:
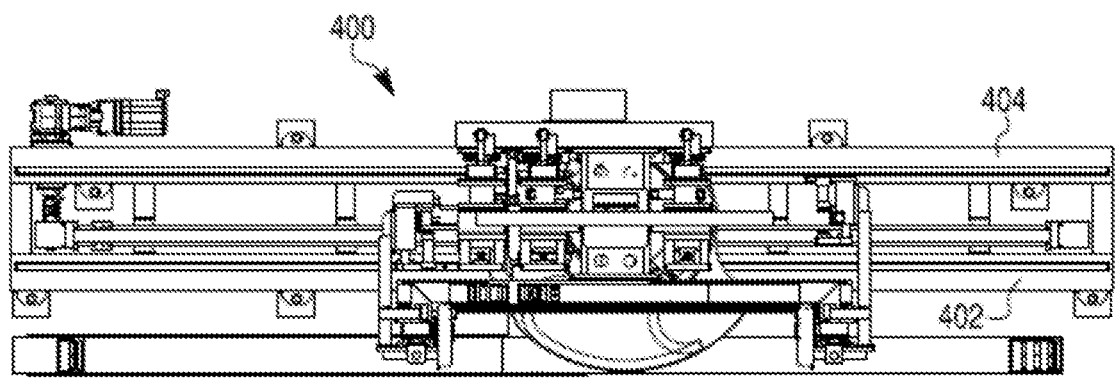
FIG. 10 is a plan view of the inter-carousel conveyor.
Figure 11:
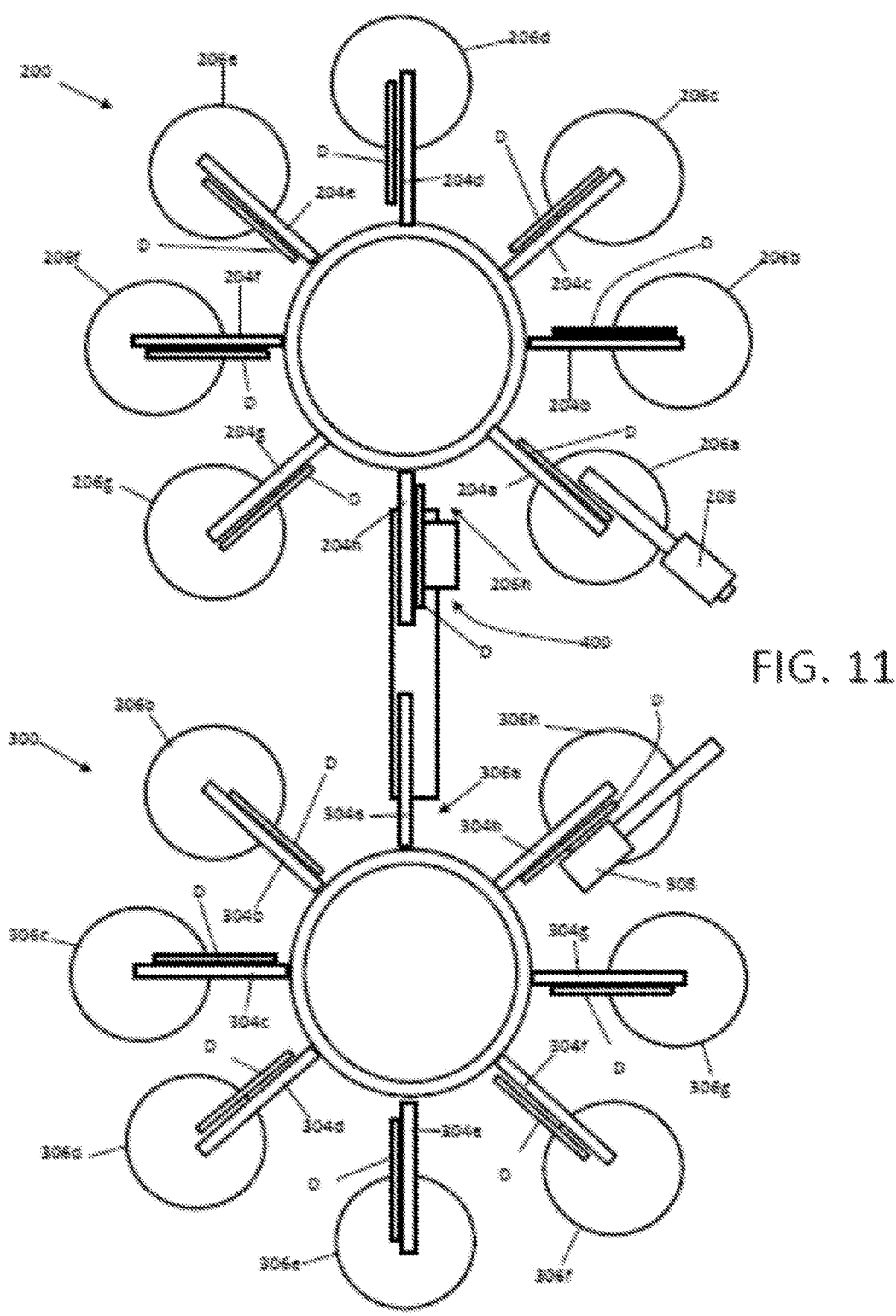
FIG. 11 is a simplified plan view of dual carousel conveyors processing doors D.

An exemplary embodiment of the inter-carousel conveyor 400 will now be described in greater detail with reference to FIGS. 6-10. The inter-carousel conveyor 400 includes parallel first and second guide rails 402 and 404 extending lengthwise between the first and second carousel rotary conveyors 200 and 300 (not shown in FIG. 6). A conveyor shuttle 406 is reciprocatingly slidable in a substantially straight line along a portion of or the entire length of the guide rails between the conveyors 200 and 300. Mounted on the conveyor shuttle 406 is a turntable 408 that moves in tandem with the conveyor shuttle 406 reciprocatingly lengthwise along the guide rails 402 and 404. The turntable 408 is rotatable about its central axis relative to the conveyor shuttle 406. The inter-carousel conveyor 408 may include door width clamps/grippers 410 and door thickness side and lower edge clamps/grippers 412 and 414. When the inter-carousel conveyor 400 is operating in the first mode of operation, the clamps/grippers 410, 412, and 414 secure the workpiece W received from a first arm 204 (e.g., first arm 204h) associated with the transfer-out station 206h and for delivering the vertical workpiece securely to the second arm 304 (e.g., second arm 304a in the state of operation depicted in FIG. 5) associated with the transfer-in station 306a. As shown in FIG. 6, the clamps/grips 410, 412, and 14 clamp or grip near the bottom of the vertical workpiece W.

In an exemplary embodiment of the first mode of operation, the inter-carousel conveyor 400 has the conveyor shuttle 406 positioned at or near an end of the guide rails 402 and 404 in closer proximity to the first carousel rotary conveyor 200. One of the first arms 204 (e.g., the first arm 204h in the state of operation depicted in FIG. 4) associated with the transfer-out station 206h delivers one of the workpieces W from the transfer-out station 206h to the inter-carousel conveyor 400, which secures the workpiece in a clamping manner with its clamps/grippers 410, 412, and 414. After the clamps/grippers 410, 412, and 414 secure the workpiece, the first arm 204h releases the workpiece and the first arm 204h is rotated counterclockwise to the next station, i.e., station 206a. The conveyor shuttle 406 travels along the guide rails 402 and 404 to a position at or near an opposite end of the guide rails 402 and 404 in closer proximity to the second carousel rotary conveyor 300 without rotating the workpiece about the turntable 408. One of the second arms 304 (e.g., the second arm 304a in the state of operation depicted in FIG. 5) associated with the transfer-in station 306a grips the workpiece W, at which point the clamps/grippers 410, 412, and 414 of the inter-carousel conveyor 400 release the workpiece. The workpiece is then indexed through the second workstations 306b-306g then to the transfer-out second station 306h of the second carousel rotary conveyor 300, all the while being gripped by the same second arm (e.g., second arm 304a) that received the workpiece at station 306a. After the clamps/grippers 410, 412, and 414 of the inter-carousel conveyor 400 have released the workpiece, the conveyor shuttle 406 returns along the guide rails 402 and 404 to its original position closer to carousel rotary conveyor 200 to receive the succeeding workpiece received by the next (succeeding) first arm 204 associated with the transfer-out station 206*h*. In this manner, the workpieces are individually, intermittently, and successively transferred from the first carousel rotary conveyor 200 to the second carousel rotary conveyor 300 as the conveyor shuttle 406 reciprocates back and forth along the guide rails.

In this first mode of operation, the conveyor shuttle 406 does not rotate the workpieces. Accordingly, first side edges of the workpieces that face inwardly towards the first hub 202 during milling operations at the first workstations 206*b*-206*g* will face outwardly away from the second hub 302 during milling operations at the second workstations 306*b*-306*g*.

Operation of the inter-carousel conveyor 400 differs in the second mode of operation. In an exemplary embodiment of the second mode of operation, the user (or program) selects only one of the first carousel rotary conveyor 200 or the second carousel rotary conveyor 300 is in operation, while the other carousel rotary conveyor 200 or 300 is placed offline.

For example, if the first carousel rotary conveyor 200 is in operation and the second carousel rotary conveyor 300 is offline, for example due to maintenance or repair, the inter-carousel conveyor 400 receives and clamps the bottom of the workpiece W received from one of the first arms 204 associated with the transfer-out station 206*h*. The first arm 204 then releases the workpiece W. The shuttle 406 moves the workpiece W away from the first rotary conveyor to provide sufficient clearance from the transfer-out station 206 to allow the turntable 408 to rotate the workpiece W 180 degrees about its central axis relative to the guide rails 402 and 404 to reverse the positions of the opposite side edges of the workpiece W. The shuttle 406 returns the reoriented workpiece W to the first arm 204, which then clamps the workpiece W. Then, the gripping devices 410, 412, and 414 of the inter-carousel conveyor 400 release the workpiece W. The first arm 204 continues its circular indexing of the workpiece W in counterclockwise direction 201 through another round of machining by the first workstations 206*b*-206*g* so that the opposite side edge of the workpiece W is machined. After the workpiece has traveled through the first workstations 206*b*-206*g* twice, the workpiece enters the first station 206*a* for a third time, and is transferred to the first shuttle 208. The first shuttle 208 grips the workpiece from the bottom, after which the first arm 204 releases the workpiece. The first shuttle 208 moves the workpiece to the first robot 104 (or the second robot 106), and the first robot 104 (or the second robot 106) receives the workpiece, reorients the workpiece into a horizontal orientation, and sets the workpiece on the transfer conveyor 102.

On the other hand, if the second carousel rotary conveyor 300 is online and the first carousel rotary conveyor 200 is offline, the workpieces are fed to the second carousel rotary conveyor 300 from the transfer conveyor 102 by the second robot 106 (or the first robot 104) and the second shuttle 308. Each of the workpieces travels counterclockwise around the second carousel rotary conveyor 300 and is subject to machining at workstations 306*b*-306*g*. During the second pass of the workpiece W through station 306*a*, the inter-carousel conveyor 400 receives and clamps the bottom the workpiece W received from one of the second arms 304 of the transfer-in second station 306*a*, and the second arms 304 release the workpiece W. The shuttle 406 may move the workpiece W away from the transfer-in second station 306*a* to allow rotation of the workpiece W. The turntable 408 rotates 180 degrees about its central axis relative to the rails 402 and 404 to reverse the position of the opposite side edges of the workpiece. The second arm 304 that delivered the workpiece W to the inter-carousel conveyor 400 then clamps the workpiece, and the clamps/grippers 410, 412, and 414 of the inter-carousel conveyor 400 release the workpiece. With the workpiece now rotated 180 degrees, the second arm 304 continues its circular indexing of the workpiece through another round of machining by the second workstations 306*b*-306*g* so that the outwardly facing side edge of the workpiece is machined. Upon reaching the station 306*h* for the third time, the workpiece W is gripped by the second shuttle 308 and released by the second arm 304. The workpiece W is transferred by the second shuttle 308 to the second robot 106 (or the first robot 104) for unloading onto the linear transfer conveyor 102.

As mentioned above, the inter-carousel conveyor 400 is selectively operable in a first mode or second mode. The selection of a first or second mode of operation may be made automatically by pre-programming of the system. Alternatively, selection between the first and second modes of operation may be performed manually by the user by entry of a command at the user interface. As discussed below with respect to the illustrated embodiment, the first mode of operation correlates to a standard operation in which both the first and second carousel rotary conveyors 200 and 300 and their associated stations are in operation/online, whereas the second mode of operation corresponds to situations in which one of the first or second carousel rotary conveyors 200 or 300 is "offline," for example as the result of a malfunction or maintenance.

The first mode typically is associated with normal operation of the system 10. Individual workpieces are advanced by the transfer conveyor 102, successively loaded one at a time by the first robot 104 to the first shuttle 208, which delivers the workpiece to the loading station 206*a* of the first carousel rotary conveyor 200 for receipt by one of the first arms (e.g., arm 204*a* in FIGS. 1 and 3), indexed through the first workstations 206*b*-206*g* in an intermittent manner while being held by the same first arm (e.g., arm 204*a* that rotates in direction 201 relative to the first stations 206) to perform machining or other operations on the workpiece, and indexed to the transfer-out station 206*h* for loading onto the inter-carousel conveyor 400. The machining operations performed by the first workstations 206*b*-206*g* associated with the first carousel rotary conveyor 200 are typically performed on the workpiece first side edge facing away from the first hub 202, and optionally on the bottom and top edges of the workpieces.

The inter-carousel conveyor 400 operating in the first mode conveys the workpiece received from the transfer-out station 206*h* (after having been indexed through first stations 206*a*-206*g* as discussed above) to the transfer-in station 306*a* of the second carousel rotary conveyor 300 for receipt by one of the second arms (e.g., arm 304*a* in the state of operation shown in FIG. 5) in a manner described above in connection with FIGS. 6-10. As received by the second carousel rotary conveyor 300, the first side edge of the workpiece (that was machined by the first workstations 206*b*-206*g* the first carousel rotary conveyor 200) faces toward the second hub 302 and the opposite second side edge of the workpiece (that was not machined by the first workstations 206*b*-206*g* of the first carousel rotary conveyor 200) faces away from the second hub 302. The workpiece is indexed through the second workstations 306*b*-306*g* while being held by the same second arm 304 that receives the workpiece from the inter-carousel conveyor 400 (e.g., the second arm 304*a* in the state of operation shown in FIG. 5)

to perform machining or other operations on the workpiece. The machining or other operations performed by the second workstations 306b-306g associated with the second carousel rotary conveyor 300 are typically performed on the workpiece second side edge facing away from the second hub 302, i.e., outwardly. The workpiece is then rotated to second station 306h, where the workpiece is transferred to the second shuttle 308 for delivery to the second robot 106 for off-loading onto the linear transfer conveyor 102.

As a result of indexing workpieces through the respective workstations 206b-206g and 306b-306g of the first and second carousel rotary conveyors 200 and 300 in the first mode of operation, the first side edge or face is machined by the first workstations 206b-206g and the opposite second side edge or face is machined by the second workstations 306b-306g. The top and bottom edges and side surfaces of the workpiece may be machined by any of the first workstations 206b-206g and/or any of the second workstations 306b-306g. The workpiece is then indexed to the unloading/transfer-out second station 306h for transfer by the second shuttle 308 to the second robot 106, which reorients the workpiece in a horizontal orientation and places the workpiece back to the transfer conveyor 102 to a position corresponding to that occupied by workpiece 74 in FIGS. 1 and 3. The transfer conveyor 102 intermittently conveys the machined workpieces (to the left in FIG. 1) to downstream operations, which may include attachment of hardware, stacking, and/or preparation of the machined workpieces for shipment.

In the second mode of operation, the inter-carousel conveyor 400 is operable to successively reorient the workpieces of a selected one of the first carousel rotary conveyor 200 or the second carousel rotary conveyor 300 by approximately 180 degrees of rotation for further successive rotational conveyance of the workpieces through the stations associated with the selected first or second carousel rotary conveyor 200 or 300. In an exemplary embodiment, in the second mode the inter-carousel conveyor 400 is operable to successively receive the workpieces that have been indexed through a selected one of the first carousel rotary conveyor or the second carousel rotary conveyor 200 or 300, reorient the workpieces by approximately 180 degrees of rotation, and return the reoriented workpieces to the same selected first carousel rotary conveyor or the second carousel rotary conveyor 200 or 300 for further successive rotational conveyance (indexing) of the workpieces through one or more of the workstations associated with the selected first or second carousel rotary conveyor 200 or 300.

The second mode of operation allows a selected one of the first carousel rotary conveyor 200 or the second carousel rotary conveyor 300 to machine or otherwise work both side edges or faces of the workpieces without involving the other non-selected carousel rotary conveyor 200 or 300. A first (typically outer) side edge is machined or otherwise worked as the workpiece is indexed through the workstations associated with the selected carousel rotary conveyor 200 or 300 in a first pass of the workpiece through those workstations. The inter-carousel conveyor 400 then reorients the workpiece by 180 degrees so that the first and second side edges are reversed in position. The reoriented workpiece is then indexed through the workstations associated with the selected carousel rotary conveyor 200 or 300 in a second pass for machining or otherwise working the second side edge that faces outwardly in the second pass.

The second mode of operation is particularly useful in the event that one of the two carousel conveyors 200 or 300 or one or more workstations associated with one of the conveyors 200 or 300 experiences a malfunction, must be shut down for repair or routine maintenance, is offline, or otherwise goes out of service or requires downtime.

For example, if the second carousel rotary conveyor 300 is offline, the process may be practiced in the second mode, albeit at a reduced throughput, to continue workpiece production of the system 10 without use of the second carousel rotary conveyor 300. The transfer conveyor 102 and the first robot 104 successively and intermittently feed and load an individual workpiece to the first shuttle 108, which moves diagonally towards the first hub 102 to a location at which the workpiece is grasped by one of the first arms (e.g., the first arm 204a in FIGS. 1 and 3) of the first carousel rotary conveyor 200 associated with the loading station 206a. The first arms 204 (including the first arm 204a) successively and intermittently index the workpieces through the first workstations 206b-206g, where milling or other operations are performed, typically on one of the two opposite side edges (usually the first side edge farther away from the first hub 202), and optionally on the top edge and/or bottom edge of the workpiece. When the workpiece reaches transfer-out station 206h, the workpiece is unloaded onto the inter-carousel conveyor 400, which reorients the workpiece by rotating it 180 degrees so that the first side edge that faced away from the first hub 202 and was machined during the first round of indexing now faces towards the first hub 202, and the opposite second side edge that faced towards the first hub 202 during the first round of indexing now faces away from the first hub 202. The reoriented workpiece is then returned from the inter-carousel conveyor 400 to the transfer-out station 206h. The workpiece is then re-indexed through the first station 206a and the first workstations 206b-206g in a second pass along direction 201 for machining the opposite second side edge of the workpiece, and optionally for further machining of the top edge and/or bottom edge of the workpiece. Optionally, the workpiece can be reoriented at transfer-out station 206h after the second indexing round has been completed. The first hub 202 rotates to return the workpiece on the first arm 204 (e.g., 204a) to the station 206a for the third time. The workpiece (which now has had each of its opposite side edges machined or otherwise worked) is then transferred from the station 206a to the first shuttle 208 and delivered to the first robot 104, which unloads the workpiece from the first shuttle 208 and reorients the workpiece into a horizontal orientation before placing and releasing the workpiece on the transfer conveyor 102 at a location corresponding to that occupied by workpiece 74 in FIGS. 1 and 3.

Alternatively, if the first carousel rotary conveyor 200 is offline, the process may be practiced in the second mode to continue workpiece production of the system 10 without use of the first carousel rotary conveyor 200. The transfer conveyor 102 and the second robot 106 successively and intermittently feed and load individual workpieces onto the second shuttle 308, which delivers the workpiece to the station 306h at which the second arm associated with the station 306h (e.g., the second arm 304h in the state of operation shown in FIG. 5) grips the workpiece. The second shuttle 308 then releases the workpiece and returns to the second robot 106 for receipt of the succeeding workpiece. The second arm 304h successively and intermittently indexes the workpiece through the second workstations 306b-306g, where milling or other operations are performed, typically on one of the two opposite side edges (usually the first side edge facing away from the second hub 302), and optionally on the top edge and/or bottom edge of the workpieces. When a workpiece completes one round of indexing and returns for a second time to the second station 306a, the workpiece is transferred to the inter-carousel conveyor 400, which reorients the workpiece by rotating it 180 degrees so that the first side edge that faced away from the second hub 302 and was machined during the first round of indexing on the second carousel rotary conveyor 300 now faces towards the second hub 302, and the opposite second side edge that faced towards the second hub 302 during the first round of indexing now faces away from the second hub 302. The workpiece is then re-indexed through the second workstations 306b-306g in a second pass along direction 301 for machining the opposite second side edge of the workpiece, and optionally for further machining of the top edge and/or bottom edge of the workpiece. The second hub 302 rotates during the indexing process to return the workpiece to the station 306h associated with the second shuttle 308 and the second robot 106 for the third time. The second shuttle 308 receives the workpiece from the station 306h, and delivers the workpiece to the second robot 106. The second robot 106 grasps and reorients the workpiece into a horizontal orientation, and situates and releases the horizontal workpiece on the transfer conveyor 102 at a location corresponding to that occupied by workpiece 74 in FIGS. 1 and 3.

The operations described herein are preferably performed in an intermittent and successive manner to optimize workpiece production in the system 10. The workpieces spend the required amount of time at each of the first stations 206 and/or the second stations 306 during the intermittent movement through the system 10. Thus, for example, during the period of time that workpieces are being machined at respective first workstations 206b-206g and second workstations 306b-306g: (1) in the first mode, the workpiece at the first station 206h is simultaneously transported by the inter-carousel conveyor 400 from the transfer-out station 206h to the transfer-in station 306a; and (2) in the second mode, the workpiece at either the first station 206h or the second station 306a is transferred to the inter-carousel conveyor 400, rotated 180 degrees by the inter-carousel conveyor 400, and returned to the first station 206h or the second station 306a for further indexing and machining in the same carousel rotary conveyor 200 or 300.

As noted above, the present invention is particularly useful for door manufacturing, especially but not limited to solid doors. However, the invention is not limited to door manufacturing. Other workpieces may be processed, such as other construction and building workpieces. Additionally, operations other than milling can be performed at the workstations 206b-206g and 306b-306g. Also, the exemplary embodiments are described with respect to machining the opposite side and end edges of the workpiece. The orientation of the arms 204 and 304 may be changed so that the opposite main surfaces of the workpieces are arranged to be machined by the workstations associated with the carousel rotary conveyors 200 and 300. Alternatively, the locations of the workstations relative to the arms may be altered for machining or otherwise working the opposite main surfaces of the workpieces.

Exemplary embodiments and exemplary methods described herein may allow improved, more efficient, and quicker processing of workpieces, especially when a workstation or associated equipment, such as a carousel, is offline due to malfunction, maintenance or repair. For example, operation of the system 10 may be switched from the first mode to the second mode when one of the first and second carousel rotary conveyors 200 or 300 is offline, thereby processing workpieces through only the online carousel rotary conveyor 200 or 300. When both conveyors 200 and 300 are online, the operation of the system 10 may be switched back to first mode. As a result, when one of the conveyors 200 or 300 is offline, the system 10 remains online through operation of the other conveyor 200 or 300 that is not offline.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. The specification describes specific examples to accomplish a more general goal that may be accomplished in another way.

What is claimed is:

1. A workpiece processing system, comprising:
    a first carousel rotary conveyor associated with a first plurality of stations configured to successively rotationally convey workpieces through the first plurality of stations;
    a second carousel rotary conveyor associated with a second plurality of stations configured to successively rotationally convey the workpieces through the second plurality of stations; and
    an inter-carousel conveyor configured to selectively operate in a first mode and a second mode, wherein in the first mode the inter-carousel conveyor is operable to successively transfer the workpieces successively rotationally conveyed through the first plurality of stations from the first carousel rotary conveyor to the second carousel rotary conveyor for successively rotationally conveying the workpieces through the second plurality of stations, and wherein in the second mode the inter-carousel conveyor is operable to successively reorient the workpieces successively rotationally conveyed through the stations associated with a selected one of the first carousel rotary conveyor or the second carousel rotary conveyor by approximately 180 degrees of rotation for further successive rotational conveyance of the workpieces through the stations associated with the selected one of the first carousel rotary conveyor or the second carousel rotary conveyor.

2. The workpiece processing system of claim 1, wherein in the second mode the inter-carousel conveyor is operable to successively remove the workpieces from the selected one of the first carousel rotary conveyor or the second carousel rotary conveyor, reorient the workpieces by approximately 180 degrees of rotation, and return the reoriented workpieces to the selected one of the first carousel rotary conveyor or the second carousel rotary conveyor for further successive rotational conveyance of the workpieces through the stations associated with the selected one of the first carousel rotary conveyor or the second carousel rotary conveyor.

3. The workpiece processing system of claim 1, wherein the inter-carousel conveyor comprises a shuttle configured to reciprocatingly move between the first and second carousel rotary conveyors.

4. The workpiece processing system of claim 1, wherein the inter-carousel conveyor comprises a linear guide extending between the first and second carousel rotary conveyors, a shuttle reciprocatingly movable on the linear guide between the first carousel rotary conveyor and the second carousel rotary conveyor, and a turntable supported on, reciprocatingly movable with, and rotatable at least 180 degrees relative to the shuttle.

5. The workpiece processing system of claim 1, wherein the workpiece is a wood door.

6. A workpiece processing system, comprising:
a first carousel rotary conveyor comprising a first hub with a first rotational axis and a plurality of first arms, wherein the first arms are operable to hold and release workpieces conveyed to and from the first carousel rotary conveyor, and wherein the first arms are operatively connected to the first hub to rotate about the first rotational axis and thereby successively rotationally convey the workpieces through a first plurality of stations associated with the first carousel rotary conveyor;
a second carousel rotary conveyor comprising a second hub with a second rotational axis and a plurality of second arms, wherein the second arms are operable to hold and release the workpieces conveyed to and from the second carousel rotary conveyor, and wherein the second arms are operatively connected to the second hub to rotate about the second rotational axis and thereby successively rotationally convey the workpieces through a second plurality of stations associated with the second carousel rotary conveyor; and
an inter-carousel conveyor configured to selectively operate in a first mode and a second mode, wherein in the first mode the inter-carousel conveyor is operable to successively transfer the workpieces successively rotationally conveyed through the first plurality of stations from the first carousel rotary conveyor to the second carousel rotary conveyor for successively rotationally conveying the workpieces through the second plurality of stations, and wherein in the second mode the inter-carousel conveyor is operable to successively reorient the workpieces successively rotationally conveyed through the stations associated with a selected one of the first carousel rotary conveyor or the second carousel rotary conveyor by approximately 180 degrees of rotation for further successive rotational conveyance of the workpieces through the stations associated with the selected one of the first carousel rotary conveyor or the second carousel rotary conveyor.

7. The workpiece processing system of claim 6, wherein in the second mode the inter-carousel conveyor is operable to successively remove the workpieces from the selected one of the first carousel rotary conveyor or the second carousel rotary conveyor, reorient the workpieces by approximately 180 degrees of rotation, and return the reoriented workpieces to the selected one of the first carousel rotary conveyor or the second carousel rotary conveyor for further successive rotational conveyance of the workpieces through the stations associated with the selected one of the first carousel rotary conveyor or the second carousel rotary conveyor.

8. The workpiece processing system of claim 6, wherein the inter-carousel conveyor comprises a shuttle configured to reciprocatingly move between the first and second carousel rotary conveyors.

9. The workpiece processing system of claim 6, wherein the inter-carousel conveyor comprises a linear guide extending between the first and second carousel rotary conveyors, a shuttle reciprocatingly movable on the linear guide between the first carousel rotary conveyor and the second carousel rotary conveyor, and a turntable supported on, reciprocatingly movable with, and rotatable at least 180 degrees relative to the shuttle.

10. The workpiece processing system of claim 6, wherein:
the first rotational axis is a first vertical rotational axis, the plurality of first arms extend radially relative to the first vertical rotational axis, the first arms are operable independently of one another to grip and release the workpieces conveyed to and from the first carousel rotary conveyor, the first arms are operatively connected to the first hub to rotate in substantial unison with one another about the first vertical rotational axis and thereby intermittently and successively convey the workpieces through the stations associated with the first carousel rotary conveyor, and the stations associated with the first carousel rotary conveyor comprise a plurality of first tooled workstations each comprising at least one associated first tool for working upon the workpiece; and
the second rotational axis is a second vertical rotational axis spaced apart from the first vertical rotational axis, the plurality of second arms extend radially relative to the second vertical rotational axis, the second arms are operable independently of one another to grip and release the workpieces conveyed to and from the second carousel rotary conveyor, the second arms are operatively connected to the second hub to rotate in substantial unison with one another about the second vertical rotational axis and thereby intermittently and successively convey the workpieces through the stations associated with the second carousel rotary conveyor, and the stations associated with the second carousel rotary conveyor comprise a plurality of second tooled workstations each comprising at least one associated second tool for working upon the workpiece.

11. The workpiece processing system of claim 10, wherein:
the first arms operably clamp the workpieces to retain the workpieces in a first vertical position to permit the first tools of the first tooled workstations to machine a first side edge of the workpieces; and
the second arms operably clamp the workpieces to retain the workpieces in a second vertical position to permit the second tools of the second tooled workstations to machine a second side edge of the workpieces, the first and second side edges being opposite to one another.

12. The workpiece processing system of claim 6, wherein:
the first plurality of stations associated with the first carousel rotary conveyor comprise a first transfer-in station and a first transfer-out station;
the second plurality of stations associated with the second carousel rotary conveyor comprise a second transfer-in station and a second transfer-out station; and
in the first mode the inter-carousel conveyor is operable to successively and intermittently transfer the workpieces from first transfer-out station to the second transfer-in station.

13. The workpiece processing system of claim 6, further comprising a first robot and a second robot, wherein:
when the inter-carousel conveyor is in the first mode, the first robot is configured to load the workpieces successively and intermittently onto the first arms of the first carousel rotary conveyor and the second robot is configured to unload the workpieces successively and intermittently from the second arms of the second carousel rotary conveyor.

14. The workpiece processing system of claim 13, wherein:
the first robot is configured so that, when the inter-carousel conveyor is in the second mode and the first carousel rotary conveyor is the selected one of the first carousel rotary conveyor or the second carousel rotary conveyor, the first robot is operable to load the workpieces onto the first arms of the first carousel rotary conveyor and to unload the workpieces from the first arms of the first carousel rotary conveyor; and the second robot is configured so that, when the inter-carousel conveyor is in the second mode and the second carousel rotary conveyor is the selected one of the first carousel rotary conveyor or the second carousel rotary conveyor, the second robot is operable to load the workpieces onto the second arms of the second carousel rotary conveyor and to unload the workpieces from the second arms of the second carousel rotary conveyor.

15. The workpiece processing system of claim 6, wherein the workpiece is a wood door.

16. A method of processing workpieces, comprising the steps of:

selectively operating an inter-carousel conveyor in a first mode and a second mode, wherein in the first mode, workpieces are successively rotationally conveyed through a first plurality of stations associated with a first carousel rotary conveyor, successively transferred by the inter-carousel conveyor to a second carousel rotary conveyor, and successively rotationally conveyed through a second plurality of stations associated with the second carousel rotary conveyor, and wherein in the second mode, the workpieces are successively rotationally conveyed through a selected one of the first plurality of stations or the second plurality of stations, successively reoriented by approximately 180 degrees of rotation by the inter-carousel conveyor, and successively conveyed again through said selected one of the first plurality or second plurality of stations.

17. The method of claim 16, wherein said selectively operating the inter-carousel conveyor in the second mode comprises successively removing the workpieces from the selected one of the first carousel rotary conveyor or the second carousel rotary conveyor, reorienting the workpieces by approximately 180 degrees of rotation, and returning the reoriented workpieces to the selected one of the first carousel rotary conveyor or the second carousel rotary conveyor for further successive rotational conveyance of the workpieces through the stations associated with the selected one of the first carousel rotary conveyor or the second carousel rotary conveyor.

18. The method of claim 16, wherein the inter-carousel conveyor comprises a shuttle configured to move between the first and second carousel rotary conveyors.

19. The method of claim 16, wherein the inter-carousel conveyor comprises a linear guide extending between the first and second carousel rotary conveyors, a shuttle reciprocatingly movable on the linear guide, and a turntable supported on, reciprocatingly movable with, and rotatable at least 180 degrees relative to the shuttle.

20. The method of claim 16, wherein the workpiece is a wood door.

* * * * *